(12) United States Patent
Subramanian et al.

(10) Patent No.: US 10,360,099 B2
(45) Date of Patent: Jul. 23, 2019

(54) OBJECT FORMAT RESILIENT TO REMOTE OBJECT STORE ERRORS

(71) Applicant: NetApp Inc., Sunnyvale, CA (US)

(72) Inventors: Ananthan Subramanian, San Ramon, CA (US); Ganga Bhavani Kondapalli, Sunnyvale, CA (US); Cheryl Marie Thompson, Sunnyvale, CA (US); Kevin Daniel Varghese, Santa Clara, CA (US); Anil Paul Thoppil, Sunnyvale, CA (US); Qinghua Zheng, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 85 days.

(21) Appl. No.: 15/581,531

(22) Filed: Apr. 28, 2017

(65) Prior Publication Data

US 2018/0314725 A1 Nov. 1, 2018

(51) Int. Cl.
| | | |
|---|---|---|
| *G06F 11/10* | (2006.01) | |
| *G06F 12/08* | (2016.01) | |
| *G06F 3/06* | (2006.01) | |
| *G06F 16/178* | (2019.01) | |

(52) U.S. Cl.
CPC ........ *G06F 11/1004* (2013.01); *G06F 3/0619* (2013.01); *G06F 12/08* (2013.01); *G06F 16/178* (2019.01)

(58) Field of Classification Search
CPC ............. G06F 11/1004; G06F 11/1076; G06F 3/0619; G06F 17/30371; G06F 17/30377; G06F 17/30312; G06F 12/08; G06F 16/178; G06F 16/1752; G06F 16/907; G06F 16/2365; G06F 3/064; G06F 3/067
See application file for complete search history.

(56) References Cited

U.S. PATENT DOCUMENTS

| | | | |
|---|---|---|---|
| 7,996,636 B1* | 8/2011 | Prakash | G06F 3/0619 711/162 |
| 2013/0346810 A1* | 12/2013 | Kimmel | G06F 11/1076 714/54 |
| 2014/0081935 A1* | 3/2014 | Singh | G06F 11/1004 707/697 |
| 2018/0121492 A1* | 5/2018 | Sawhney | G06F 17/30377 |

* cited by examiner

*Primary Examiner* — Shelly A Chase
(74) *Attorney, Agent, or Firm* — Cooper Legal Group, LLC

(57) ABSTRACT

Techniques are provided for remote object store error handling. A storage system may store data within one or more tiers of storage, such as a local storage tier (e.g., solid state storage and disks maintained by the storage system), a remote object store (e.g., storage provided by a third party storage provider), and/or other storage tiers. Because the remote object store may not provide the same data consistency and guarantees that the storage system provides for clients such as through the local storage tier, additional validation is provided by the storage system for the remote object store. For example, when data is put into an object of the remote object store, a verification get operation is performed to read and validate information within a header of the object. Other verifications and checks are performed such as using a locally stored metafile to detect corrupt or lost metadata and/or objects.

20 Claims, 11 Drawing Sheets

OBJECT FORMAT RESILIENT TO REMOTE OBJECT STORE ERRORS

BACKGROUND

Many storage systems may provide clients with access to data stored within a plurality of storage devices. For example, a storage controller may store client data within a set of storage devices that are locally accessible (e.g., locally attached to the storage controller) or remotely accessible (e.g., accessible over a network). A storage aggregate of storage may be generated from the set of storage devices (e.g., the storage aggregate may be stored across multiple storage devices). The storage aggregate may be exported from a storage file system to a client. The storage aggregate may appear as a single storage container to the client, such as a volume or logical unit number (lun). In this way, the storage aggregate abstracts away the details, from the client, of how the storage aggregate is physically stored amongst the set of storage devices.

Some storage systems may store data within a multi-tiered storage arrangement. For example, the storage controller may store data within a hard disk drive tier and a solid state storage tier. The hard disk drive tier may be used as a capacity tier to store client data and for processing input/output operations. The solid state storage tier may be used as a cache for accelerating the processing of storage operations. Unfortunately, different storage tier have different characteristics and behaviors, which can affect performance and guarantees provided to clients by a storage system.

In an example, a storage system may utilize a local storage tier and a remote third party storage tier as two of the storage tiers within which the storage system stores data. The storage system may be able to provide high availability, security, data consistency, data protection, and/or other guarantees using the local storage tier because the storage system may manage and control the local storage tier. However, the storage system may be unable to provide similar guarantees, such as that data is properly stored, managed, is consistent, and is accurate, to clients for the remote third party storage tier because the storage system does not manage and control the remote third party storage tier. For example, new data could be written to the remote third party storage tier. When reading the new data, old data or no data could be returned by the remote third party storage tier due to delay. Thus, the storage system may be unable to provide the same level of enterprise guarantees when working with the remote third party storage tier as backend storage.

DETAILED DESCRIPTION

Figure 1:
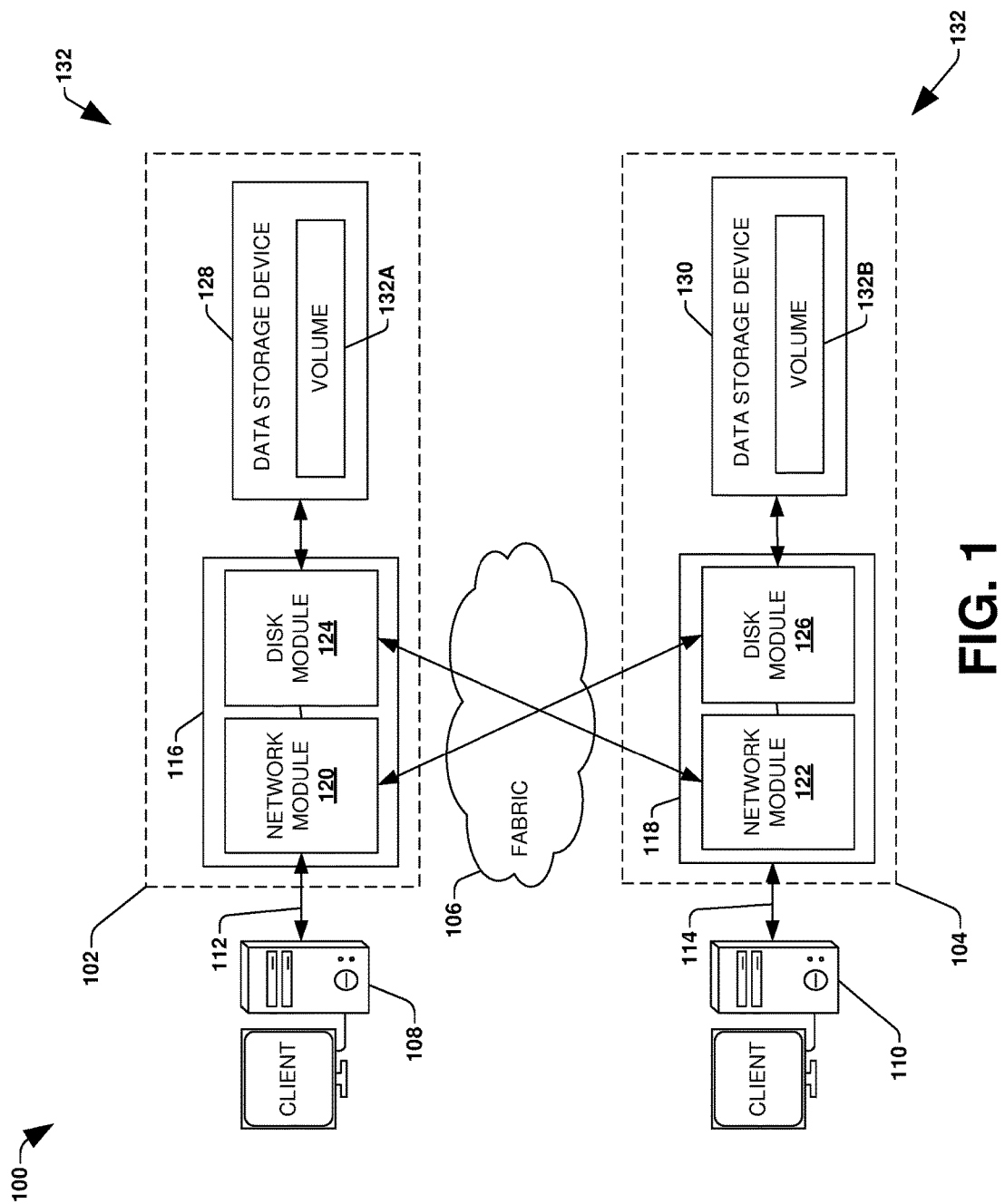
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for remote object store error handling are provided herein. A storage system may utilize multiple tiers of storage to store client data. For example, the storage system may utilize a local storage tier (e.g., a performance storage tier, such as a solid state storage tier or a hard disk drive storage tier), a remote object store tier (e.g., a distributed network of storage provided by a third party provider, cloud storage, etc.), and/or other tiers of storage.

Unfortunately, the remote object store tier may not provide adequate guarantees of data validity and consistency that the storage system guarantees for clients. For example, a remote object store may return old data instead of newly written data due to delays. In another example, the remote object store may return an object not found response for the newly written data due to delays. Accordingly, as provided herein, remote object store error handling is provided by the storage system for the remote object store. In particular, validation is provided to ensure that data written to the remote object store is associated with a correct object. Validation is also provided to ensure that metadata corruption due to disk failure does not result in incorrect data being served to clients (e.g., corruption of locally stored metadata that would otherwise direct client requests to incorrect objects within the remote object store). Validation is also provided that data served from the remote object store is verified before being used to service client requests, such as read requests. Validation is also provided to detect intermittent errors from the remote object store, and to perform adaptive retries of operations to the remote object store. Validation is also provided to track and avoid sending I/O operations for lost blocks due to lost metadata (e.g., locally stored metadata used to locate and access objects within the remote object store) or due to lost objects within the remote object store.

To provide for remote object store error handling, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 1328 associated with the data storage device 130.

It may be appreciated that remote object store error handling may be implemented within the clustered network environment 100. In an example, the node 108 and/or the node 118 may utilize a remote object store and/or the data storage devices 128, 130 for serving client requests. It may be appreciated that remote object store erroring handling may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
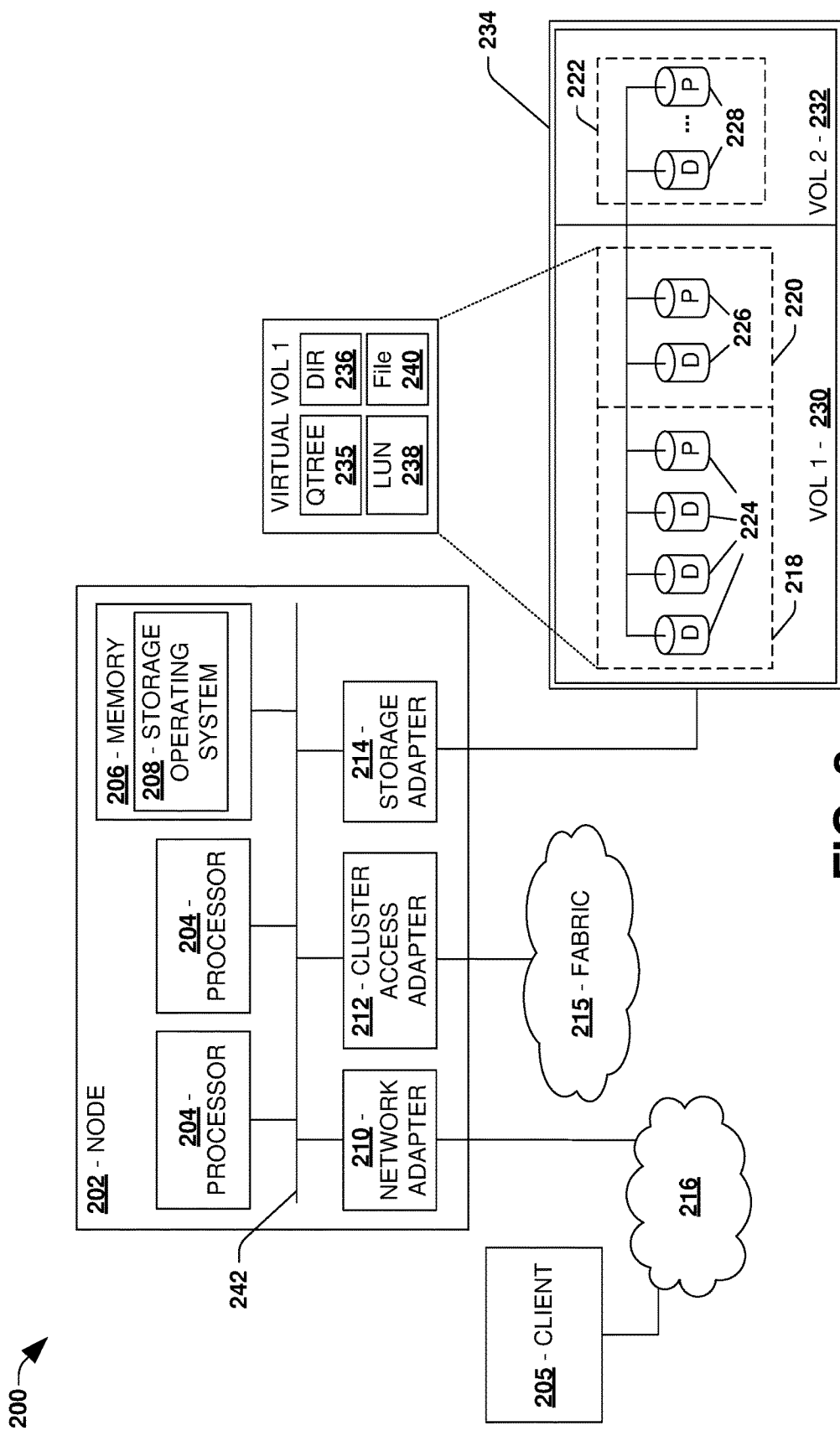
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that remote object store error handling may be implemented for the data storage system 200. In an example, the node 202 may utilize a remote object store for serving client requests. It may be appreciated that remote object store error handling may be implemented for and/or between any type of computing environment, and may be transferable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
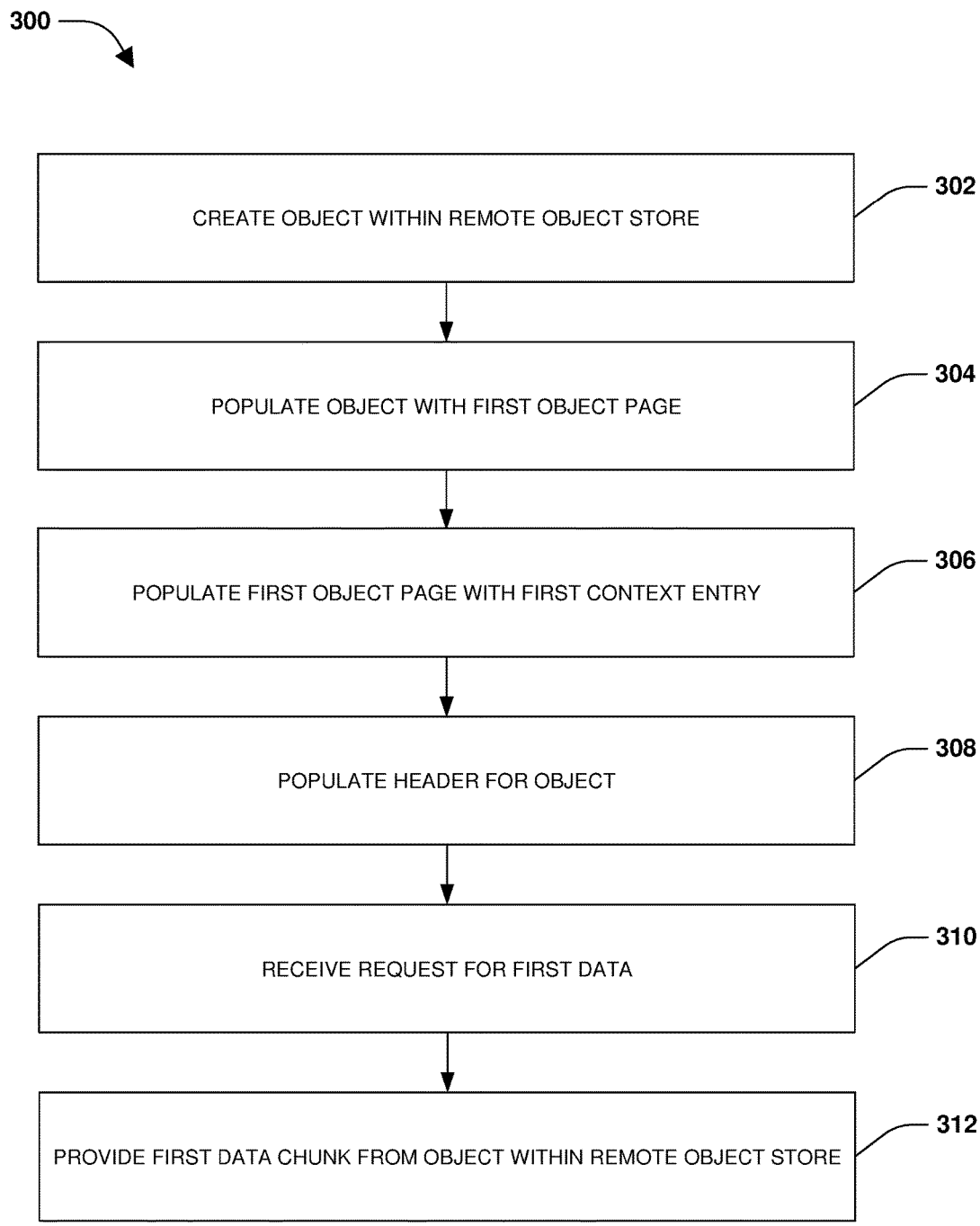
FIG. 3 is a flow chart illustrating an exemplary method of remote object store error handling.

One embodiment of remote object store error handling is illustrated by an exemplary method 300 of FIG. 3. A storage system may provide clients with access to client data stored within a backend. The backend may be configured with one or more tiers of storage. For example, the backend may be configured with a local storage tier (e.g., solid state drives, hard disk drives, etc.), a remote object store tier (e.g., a third party storage provider, cloud storage, etc.), etc. The storage system may store data within the local storage tier as a performance tier for frequently or recently accessed data because the local storage tier may have lower latency and more guarantees than the remote object store tier. The storage system may migrate data from the local storage tier to the remote object store tier (e.g., less frequently or less recently accessed data) or may store new data to the remote object store tier. Because the remote object store tier may not provide the same data consistency, validity, and/or other guarantees as the local storage tier, remote object store error handling is provided herein.

At 302, an object, into which the storage system can store data through the remote object store tier, is created within a remote object store. At 304, the object may be populated with a first object page comprising a first data chunk of first data (e.g., a 4 kilobyte block of data). In an example, the first data may be stored within the local storage tier, and may be copied/put into the object within the remote object store. The first data, such as a file, may be exported through a first volume or other storage structure (e.g., a virtual volume (vvol), a buff tree structure, a file system structure, etc.) by the storage system for client access.

At 306, the first object page may be populated with a first context entry specifying a file block number or a location, of the file block number for the first data chunk, within the first volume. For example, the first context entry comprises a context indicating that the file block number (e.g., a virtual volume block number (vvbn)) resides at a particular location within a file system tree (e.g., a buff tree structure). In an example, the first context entry is stored sequentially after the first data chuck. In an example, the first context entry is populated with checksum for the first data chunk. The checksum may be utilized to verify the first data chuck within the object. In this way, the object may be formatted to comprise a first 4 kilobyte block of data, a first context entry for the first 4 kilobyte block of data, a second 4 kilobyte block of data, a second context entry for the second 4 kilobyte block of data, etc.

At 308, a header for the object may be populated with an identifier of a name of the object and a buff tree universal identifier (buftree-uuid) of the first volume (e.g., an identifier of the file system tree). For example, the identifier comprises a hash of the name of the object and/or the buftree-uuid. The identifier can be verified to ensure that the object is using the correct name.

In an example, a two-step put and verify operation may be performed for storing data within the object. For example, the put operation is performed to store the object (e.g., or to store a data chunk into an object page within a preexisting object) to the remote object store, such as to store the first data chunk within the first object page. Responsive to the put operation completing, a verification get operation is performed to read the header of the object. The verification get operation reads the identifier from the header and verifies the identifier as the correct name of the object. The verification get operation reads the buff tree universal identifier from the header and verifies the buff tree universal identifier as referring to the first volume. In an example where the first data was being migrated from the local storage tier to the remote object store as the first data chunk, the first data may be deleted based upon the verification get operation successfully verify the identifier and the buff tree universal identifier.

In an example, once the header has been verified, data corresponding to object pages, such as the first object page, a second object page, etc., within the object can be deleted from the local storage tier. In particular, there is a single transaction that writes the header, the first object page, the second object page, etc.

The verification get operation may be issued with a same priority (e.g., execution priority, sending priority, etc.) as the put operation. The verification get operation and/or the put operation may be issued with a different priority than client put and get operations. Thus, the verification get operation is issued to the remote object store in a path (e.g., an execution or access path) that is decoupled from a client access path (e.g., a path used to send and/or process client I/O operations for data stored or to store within the remote object store) to the remote object store. In this way, the two-step put and verification get operation does not affect or hinder performance of client put and get operations.

Verification may be configured for verifying every nth object (e.g., where n is an integer number) within the remote object store (e.g., every $5^{th}$ object put into the remote object store is to be subsequently verified by a verification get operation). Upon determining that the object is an instance of the nth object, the two-step put and verify operation is performed. The put operation is performed to store the object to the remote object store. The verification get operation is performed to read the header of the object to verify the identifier and the buff tree universal identifier.

The storage system may locally maintain a metafile for one or more objects within the remote object store. The metafile may be populated with a mapping between an object identifier to an object name derived from the buff tree universal identifier and/or the sequence number. File system tree pointers point to the object identifier and a slot (e.g., an offset in the object). The name for the object may be generated based upon the buff tree universal identifier within the metafile. Monotonically increasing sequence numbers may be assigned to objects within the remote object. For example, a first sequence number may be assigned to the object. The first sequence number may be stored within the metafile as being associated with the object.

At 310, a request for the first data may be received, such as by the storage system from a client. In an example, the request may comprise a target buff tree universal identifier for the first volume. The metafile may be evaluated to determine whether the target buff tree universal identifier matches the buff tree universal identifier within the metafile. Access is provided to the first data chunk within the object for satisfying the request based upon the target buff tree universal identifier matching the buff tree universal identifier, at 312. An offset within the object can be used to access merely a portion of the object, such as the first data chunk or the first object page without accessing other portions of the object such as a second object page for a second data chunk. If the target buff tree universal identifier does not match the buff tree universal identifier, then the metafile may be determined as being corrupted.

Volume move operations may be performed to move the first volume from a first location to a second location, resulting in a moved first volume. Because the buff tree universal identifier for the first volume is locally stored within the metafile (e.g., and not within the object within the remote object store), the object does not need to be updated when the first volume is moved. Instead, the metafile is updated with an updated buff tree universal identifier for the moved first volume. In this way, bandwidth and processing resources do not need to be otherwise consumed with accessing the remote object store when the first volume is moved.

In an example, a client operation timer may be specified for timing out client operations. The client operation timer may be set to a first timeout value. A remote object store access timeout timer may be specified for timing out operations to the remote object store. The remote object store access timeout timer may be set to a second timeout value that is smaller than the first timeout value. In this way, access to the remote object store for satisfying a client access operation may be retried one or more times based upon the remote object store access timeout timer timing out before the client operation timer times out.

In an example, latency of the remote object store may be monitored. An amount of I/O throughput to the remote object store may be dynamically adjusted based upon the latency. For example, if the remote object store appears to be experiencing higher than desired latency, the I/O throughput to the remote object store may be decreased in order to decrease a load placed upon the remote object store. Otherwise, the I/O throughput may be increased to take advantage of extra processing bandwidth of the remote object store if the latency is lower than expected (e.g., the remote object store has free processing bandwidth).

In an example, the storage system may be associated with multiple remote object stores. First latency of a first remote object store may be monitored. Second latency of a second remote object store may be monitored. A first amount of I/O throughput to the first remote object store may be dynamically adjusted based upon the first latency. A second amount of I/O throughput to the second remote object store may be dynamically adjusted based upon the second latency. In this way, different remote object stores may be treated individually based upon how each remote object store is performing.

In an example, monotonically increasing sequence numbers are assigned to objects and/or object pages within the remote object store. For example, the object may be assigned a first sequence number. The first sequence number may be stored within the metafile for the object. The object may be marked as invalid based upon the first sequence number becoming corrupt or lost within the metafile. Conversely, the first sequence number may be marked as invalid based upon the object becoming corrupt or lost.

Figure 4:
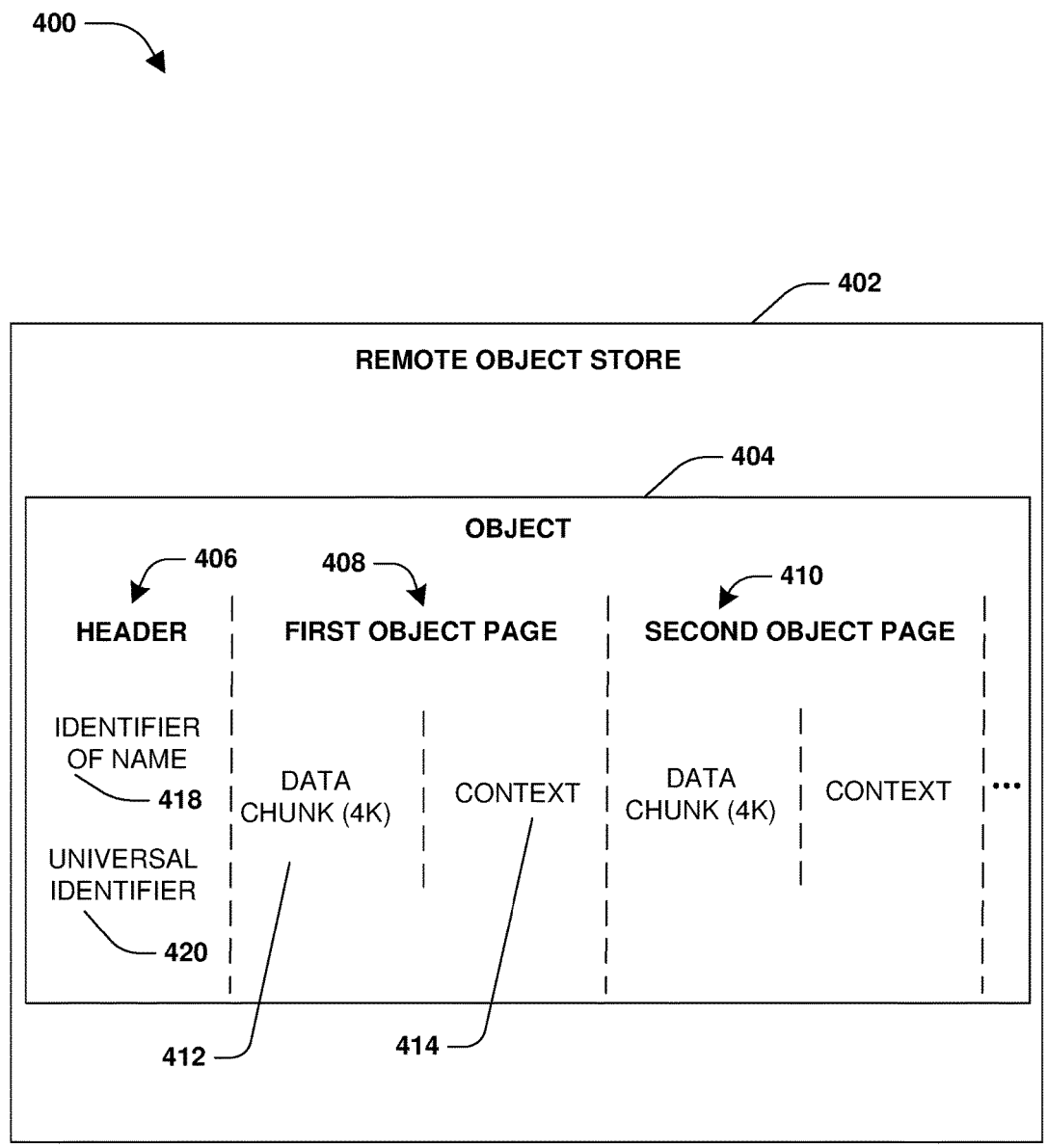
FIG. 4 is a component block diagram illustrating an exemplary computing device for remote object store error handling, where an object comprises a header and one or more object pages.

FIG. 4 illustrates an example of a system 400 for utilizing a remote object store 402 as a storage tier for a storage system. The storage system may store objects within the remote object store 402, such as an object 404. The object 404 may comprise a header 406. The header 406 may comprise a version of the object 404, an indicator as to whether the object 404 is encrypted, a creation timestamp for the object 404, a buff tree universal identifier 420 (a buftree-uuid), an identifier 418 of a name of the object 404 (e.g., a hash of the name and the buftree-uuid, which can be read back after a put operation of the object 404 or of an object page within the object 404 to verify the hash), and/or other information. In one example, the header 406 is 32 bytes or any other size of information.

The object 404 may comprise one or more object pages corresponding to data chunks, such as data chunks derived from data moved from a local storage tier (e.g., a performance storage tier, such as a solid state storage tier or a disk storage tier) of the storage system to the remote object store 402. In one example, the object 404 may comprise space for 1024 object pages, such as a first object page 408, a second object page 410, and/or other object pages. The first object page 408 may comprise a first data chunk 412 (e.g., 4 kilobytes of data or any other size of data) and a first context 414 associated with the first object page 408.

The first context 414 may comprise an indicator as to whether the object 404 is encrypted. The first context 414 may comprise an encryption key index used to identify an encryption key. The first context 414 may comprise a pseudobad indicator to indicate whether data read from the local storage tier had an error such as a disk error and the data content in the object is inconsistent. The first context 414 may comprise an indicator as to whether a RAID or storage OS marked the pseudobad error. The first context 414 may comprise an unverified error indicator to indicate that when data read from the local storage tier resulted in an unverified RAID error. The first context 414 may comprise a wrecked indicator that is set when data is forcefully corrupted. The first context 414 may comprise a file block number (e.g., a location of the file block number for the first data chunk 412 within the first volume). The first context 414 may comprise a checksum for the first data chunk 412 and the first context 414. In an example, the first context 414 may comprise 16 bytes of information or any other size of information.

Figure 5:
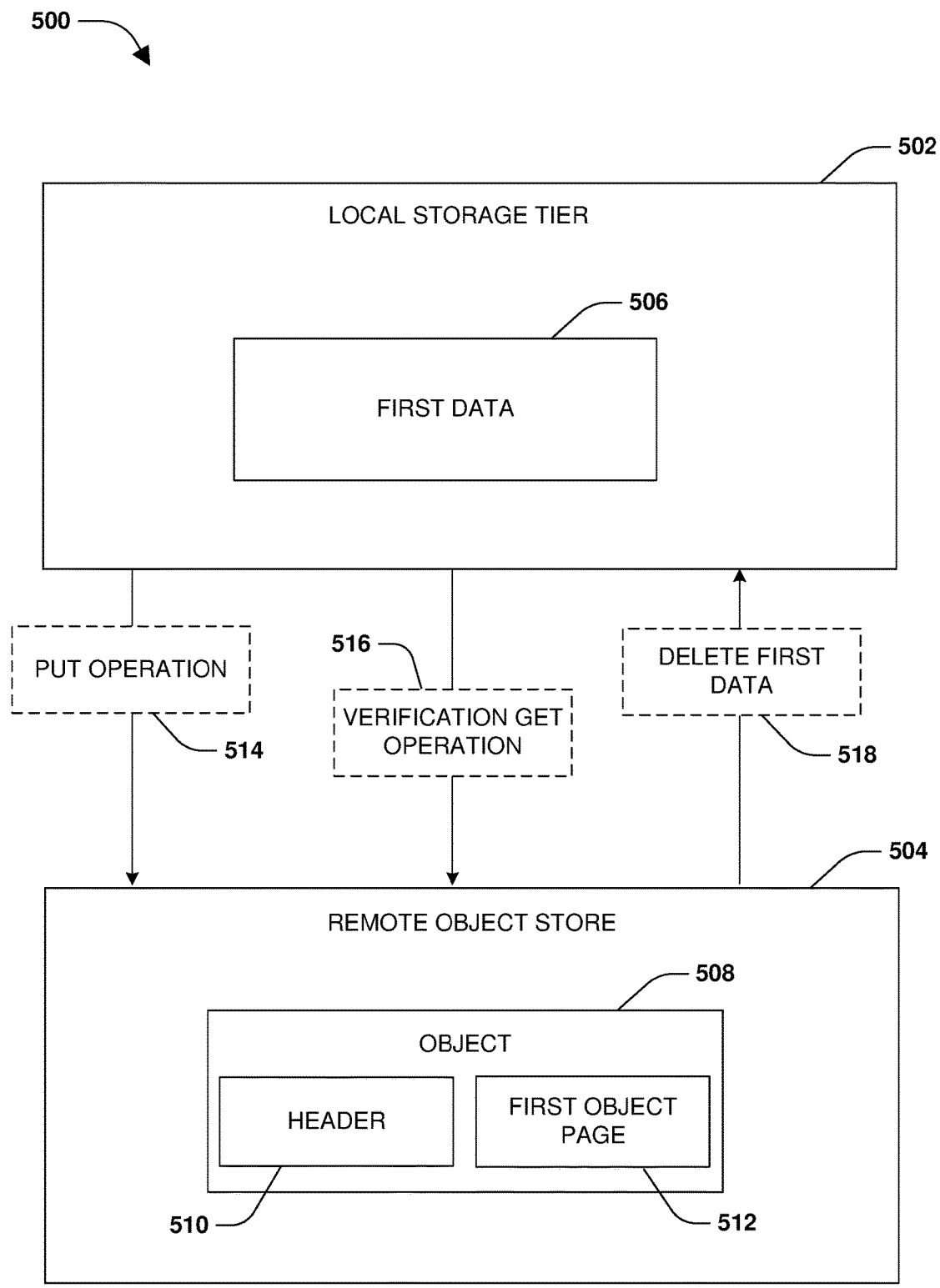
FIG. 5 is a component block diagram illustrating an exemplary computing device for remote object store error handling, where a put operation and a subsequent verification get operation are performed.

FIG. 5 illustrates an example of a system 500 for utilizing a remote object store 504 as a storage tier for a storage system. The storage system may store data, such as first data 506, with a local storage tier 502 (e.g., a performance storage tier, such as a solid state storage tier). The storage system may store data, such as newly written client data or data from the local storage tier 502, into the remote object store 504 using put operations. For example, the storage system may perform a two-step put and verify operation to move the first data 506 from the local storage tier 502 into an object 508, comprising a header 510 and one or more object pages, within the remote object store 504. The storage system may perform a put operation 514 to store the first data 506 as a first data chunk within a first object page 512 of the object 508. Upon receiving a success response from the remote object store 504 for the put operation 514, a subsequent verification get operation 516 is performed to read the header 510 and verify information within the header such as an identifier (e.g., a hash of a name of the object 508 and/or a buff tree universal identifier (buftree-uuid)) and/or the buff tree universal identifier of a first volume for the first data chunk. Upon verifying the identifier and the buff tree universal identifier, the first data 506 may be deleted 518 from the local storage tier 502.

Figure 6A:
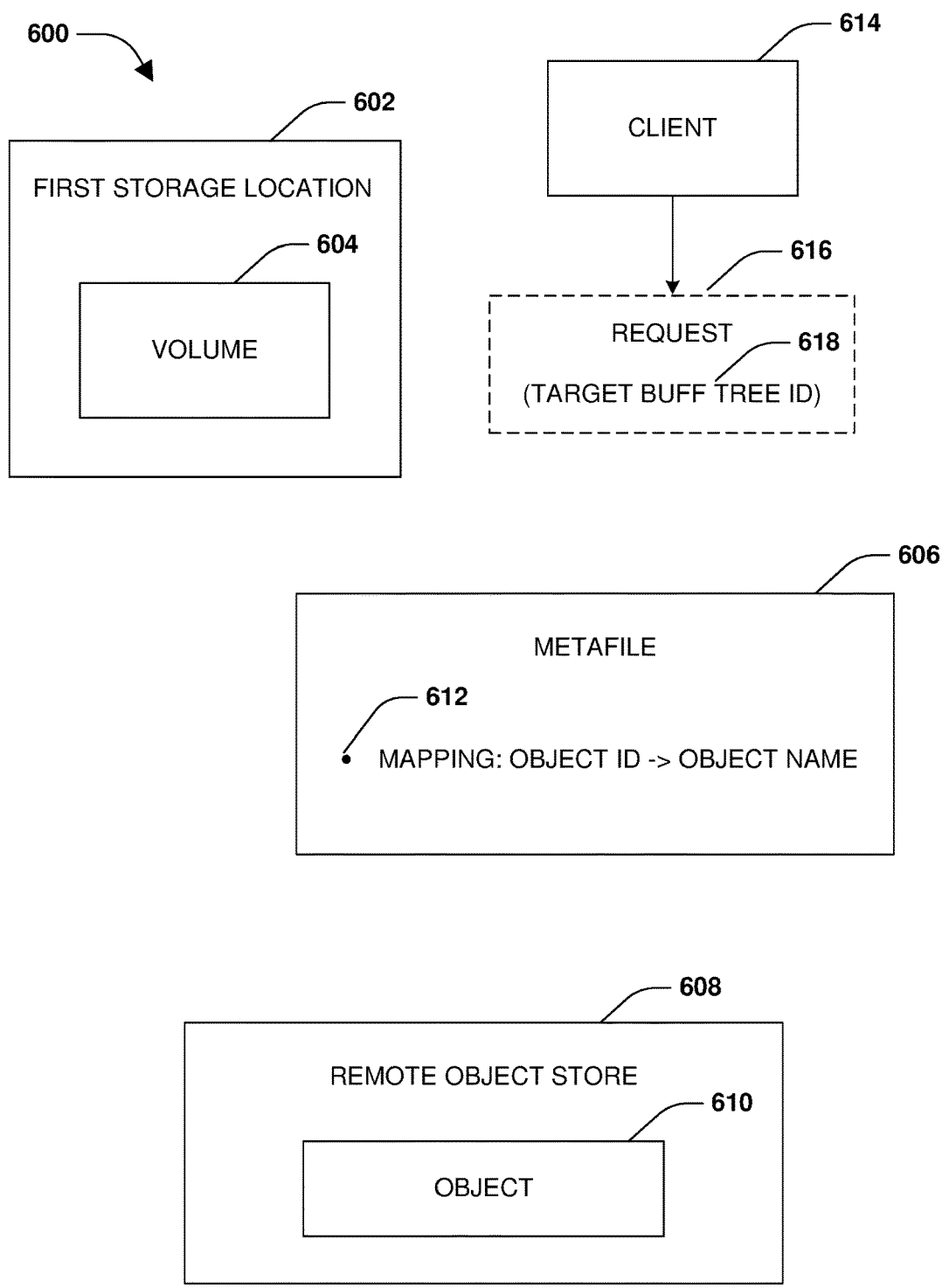
FIG. 6A is a component block diagram illustrating an exemplary computing device for remote object store error handling, where a metafile is used to validate and locate an object.
Figure 6B:
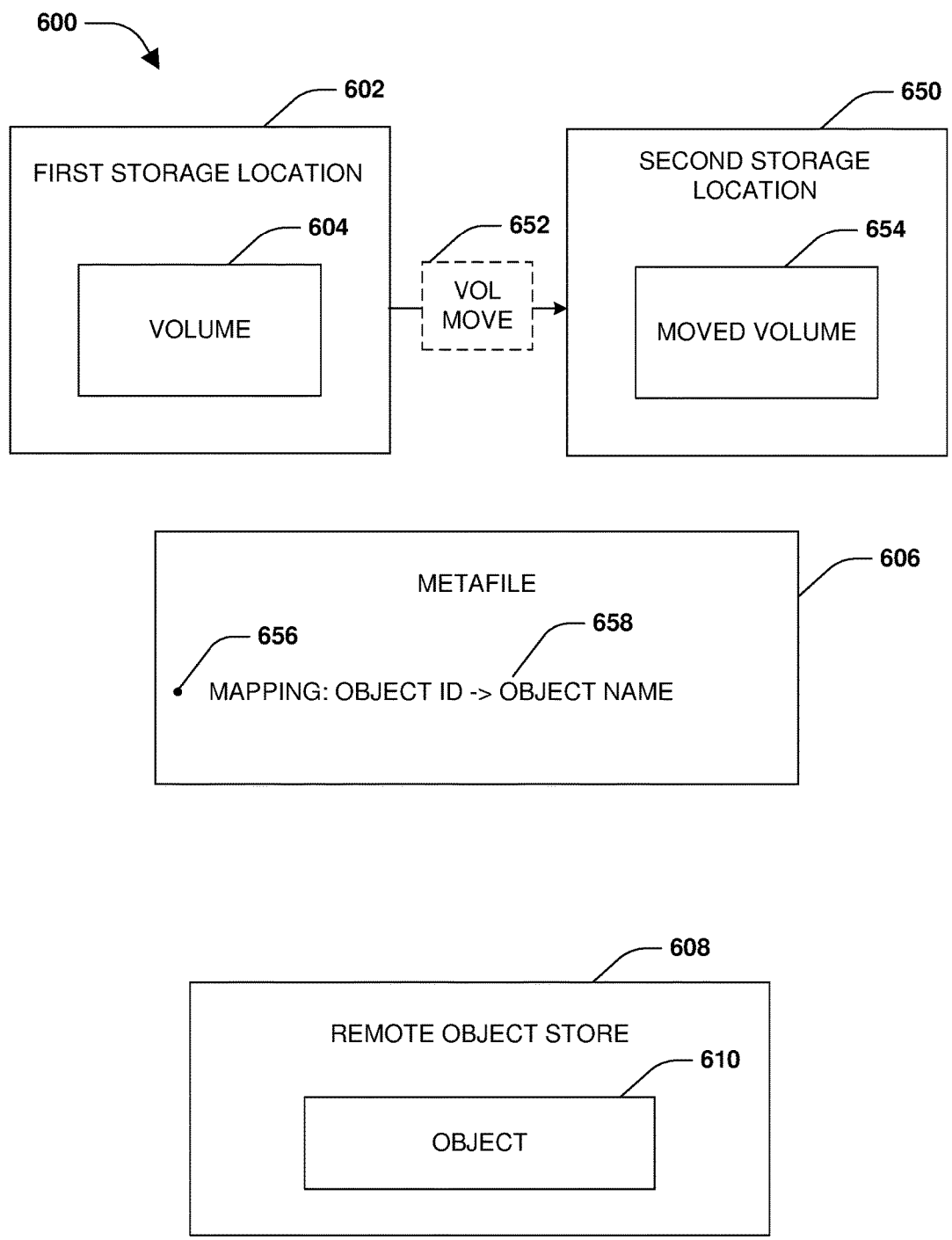
FIG. 6B is a component block diagram illustrating an exemplary computing device for remote object store error handling, where a volume move operation is performed.

FIGS. 6A and 6B illustrate examples of a system 600 for utilizing a remote object store 608 as a storage tier for a storage system. A storage system may organize client data within a volume 604 located at a first storage location 602, as illustrated in FIG. 6A. The storage system may store data of the volume 604 into an object 610 of a remote object store 608. The storage system may maintain a metafile 606 locally available to the storage system (e.g., not stored within the remote object store 608 that may be maintained by a third party provider). The metafile 606 may be populated with a mapping 612 between an object identifier of the object 610 (e.g., file system tree pointers point to the object identifier and an offset within the object 610) and an object name of the object 610. When a request 616 is received from a client 614 for accessing data within the object 610 (e.g., reading data from the object 610 or writing data to the object 610), a target buff tree identifier 618 within the request 616 is verified as matching the buff tree identifier ID within the mapping 612 of the metafile 606 for granting access to the object 610. If the target buff tree identifier 618 does not match the buff tree identifier, then the metafile 606 is determined as corrupt.

FIG. 6B illustrates a volume move operation 652 being performed to move the volume 604 from the first storage location 602 to a second storage location 650 as a moved volume 654. The metafile 606, such as the mapping 612, is updated based upon the moved volume 654 to create an updated mapping 656. In this way, the object 610 within the remote object store 608 remains valid (e.g., without the need of being updated) notwithstanding the volume move operation 652.

Figure 7:
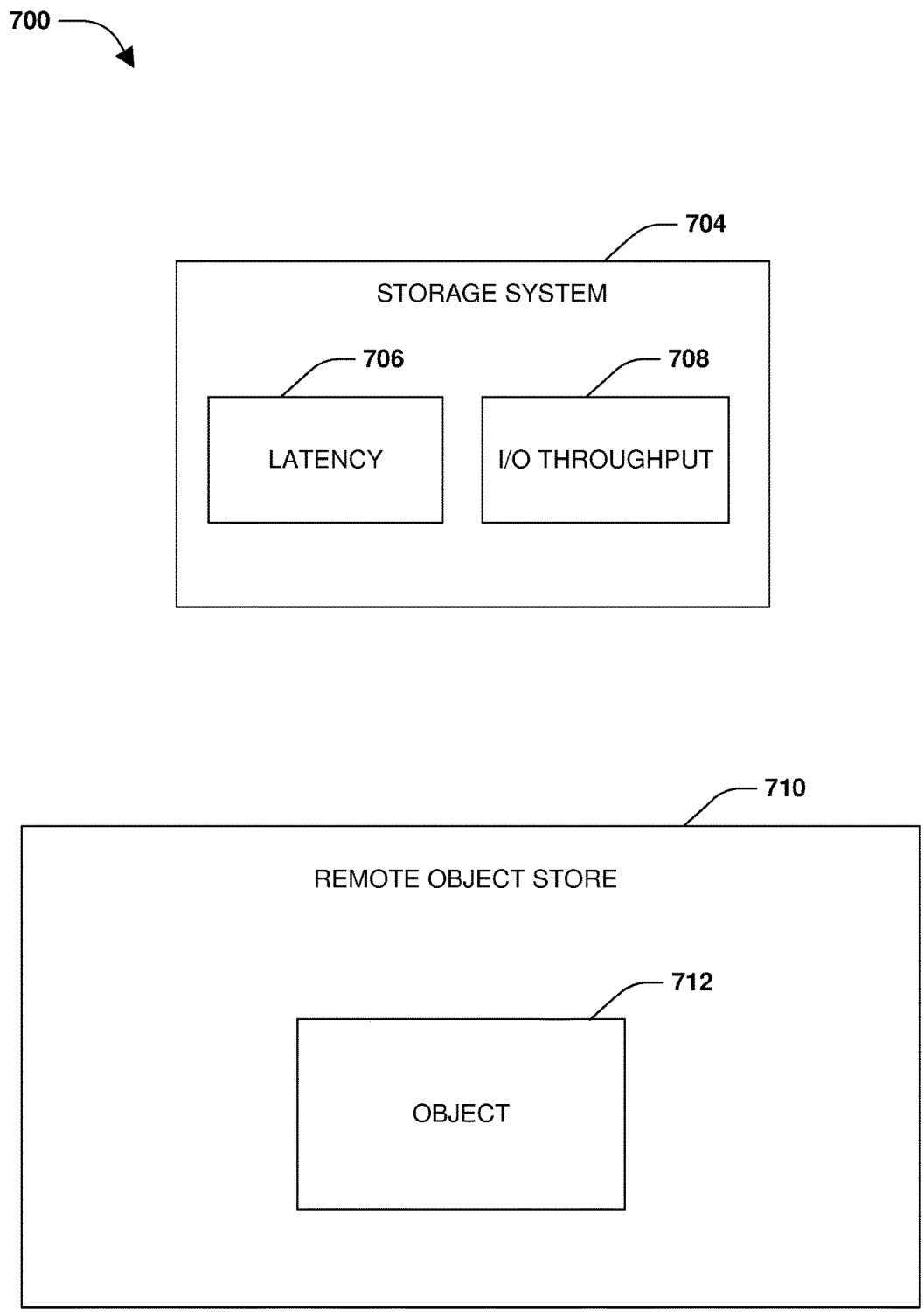
FIG. 7 is a component block diagram illustrating an exemplary computing device for remote object store error handling, where I/O throughput is dynamically adjusted based upon latency of a remote object store.

FIG. 7 illustrates an example of a system 700 for utilizing a remote object store 710 as a storage tier for a storage system 704. The storage system 704 may monitor a latency 706 of the remote object store 710, such as latency 706 when reading from or writing to an object 712 within the remote object store 710. I/O throughput 708 (e.g., a number of I/O commands for satisfying client operations issued to the remote object store 710 within a certain timespan; a number of allowed pending I/O commands; etc.) may be dynamically adjusted based upon the latency 706.

Figure 8:
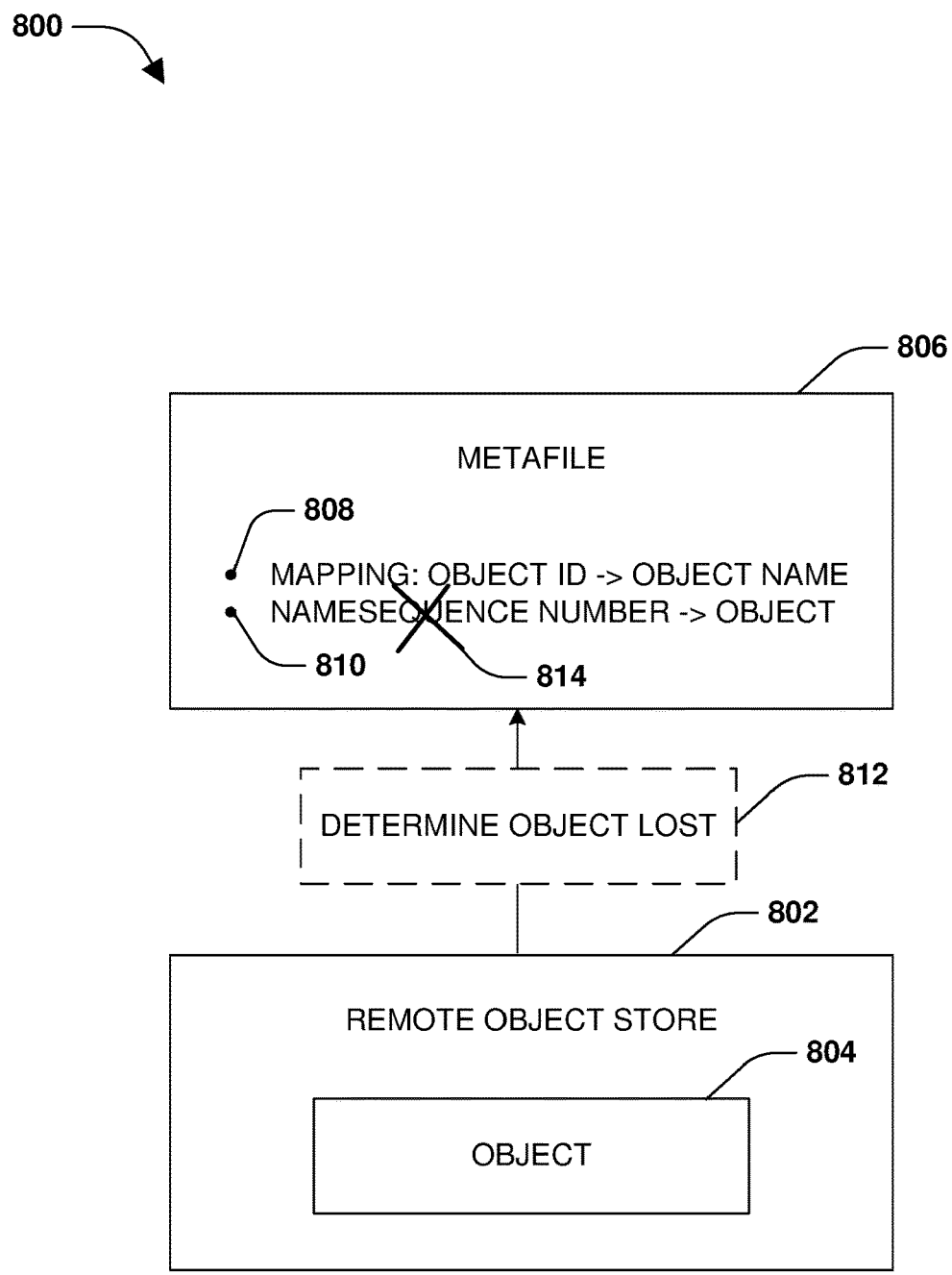
FIG. 8 is a component block diagram illustrating an exemplary computing device for remote object store error handling, where a sequence number is invalidated.

FIG. 8 illustrates an example of a system 800 for utilizing a remote object store 802 as a storage tier for a storage system. The storage system may store objects, such as object 804, within the remote object store 802. The storage system may maintain a metafile 806 for objects within the remote object store 802. The metafile 806 may be locally maintained by the storage system (e.g., not stored within the remote object store 802 that may be hosted by a third party cloud provider). The storage system may store mappings between object identifiers and objects within the remote object store 802, such as a mapping 808 for the object 804. The storage system may assign monotonically increasing sequence numbers to objects within the remote object store 802, such as a sequence number 810 for the object 804. Upon determining that the object 804 has become lost, corrupt, or invalid, then storage system marks 814 the sequence number 810 as invalid so that the object 804 is no longer accessed.

Figure 9:
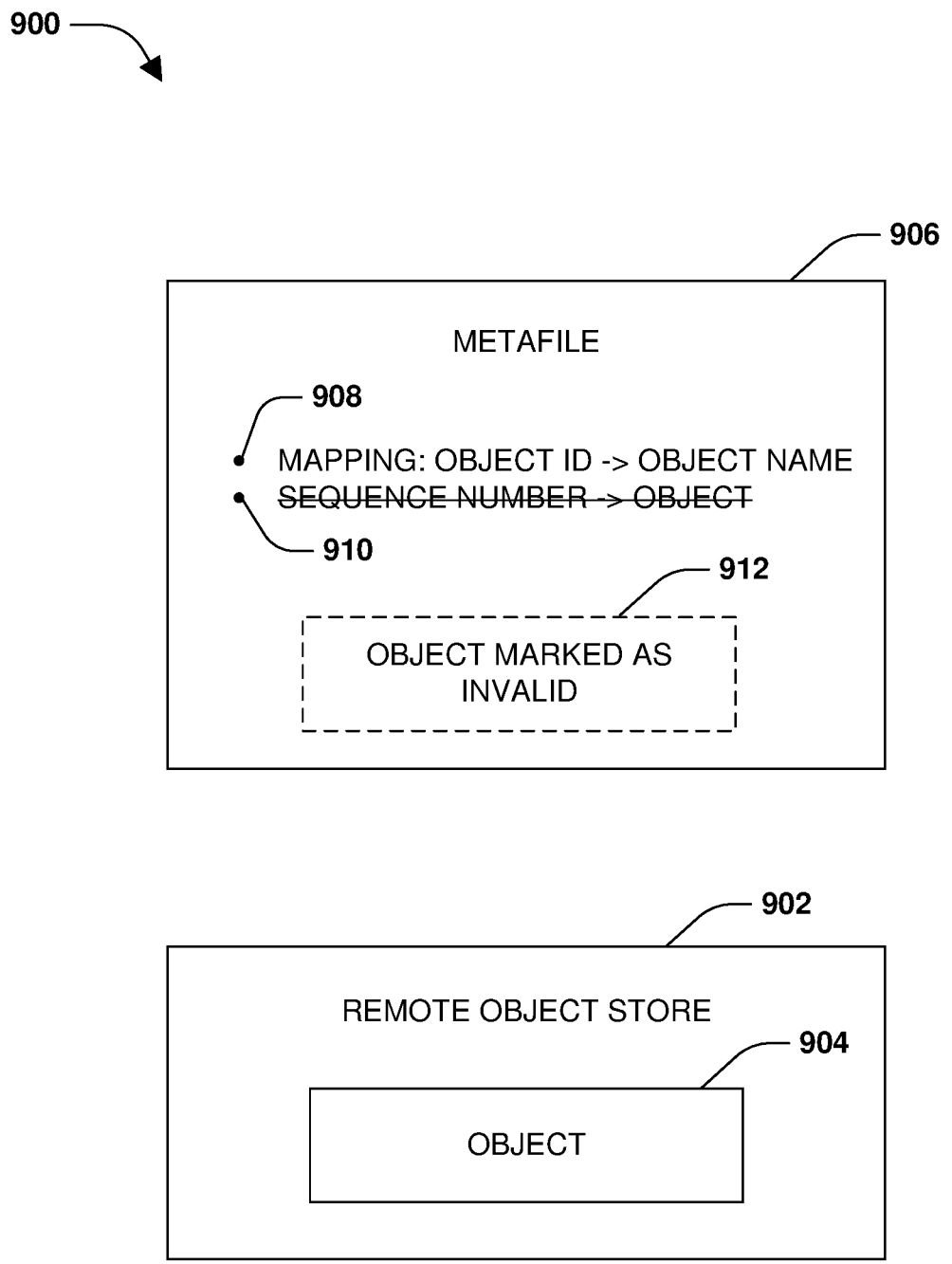
FIG. 9 is a component block diagram illustrating an exemplary computing device for remote object store error handling, where an object is invalidated.

FIG. 9 illustrates an example of a system 900 for utilizing a remote object store 902 as a storage tier for a storage system. The storage system may store objects, such as object 904, within the remote object store 902. The storage system may maintain a metafile 906 for objects within the remote object store 902. The metafile 906 may be locally maintained by the storage system (e.g., not stored within the remote object store 902 that may be hosted by a third party cloud provider). The storage system may store mappings between buff tree identifiers and objects within the remote object store 902, such as a mapping 908 for the object 904. The storage system may assign monotonically increasing sequence numbers to objects within the remote object store 902, such as a sequence number 910 for the object 904. Upon determining that the sequence number 910 has become lost, corrupt, or invalid, the object 904 may be marked as invalid 912 so that the object 904 is no longer accessed.

Figure 10:
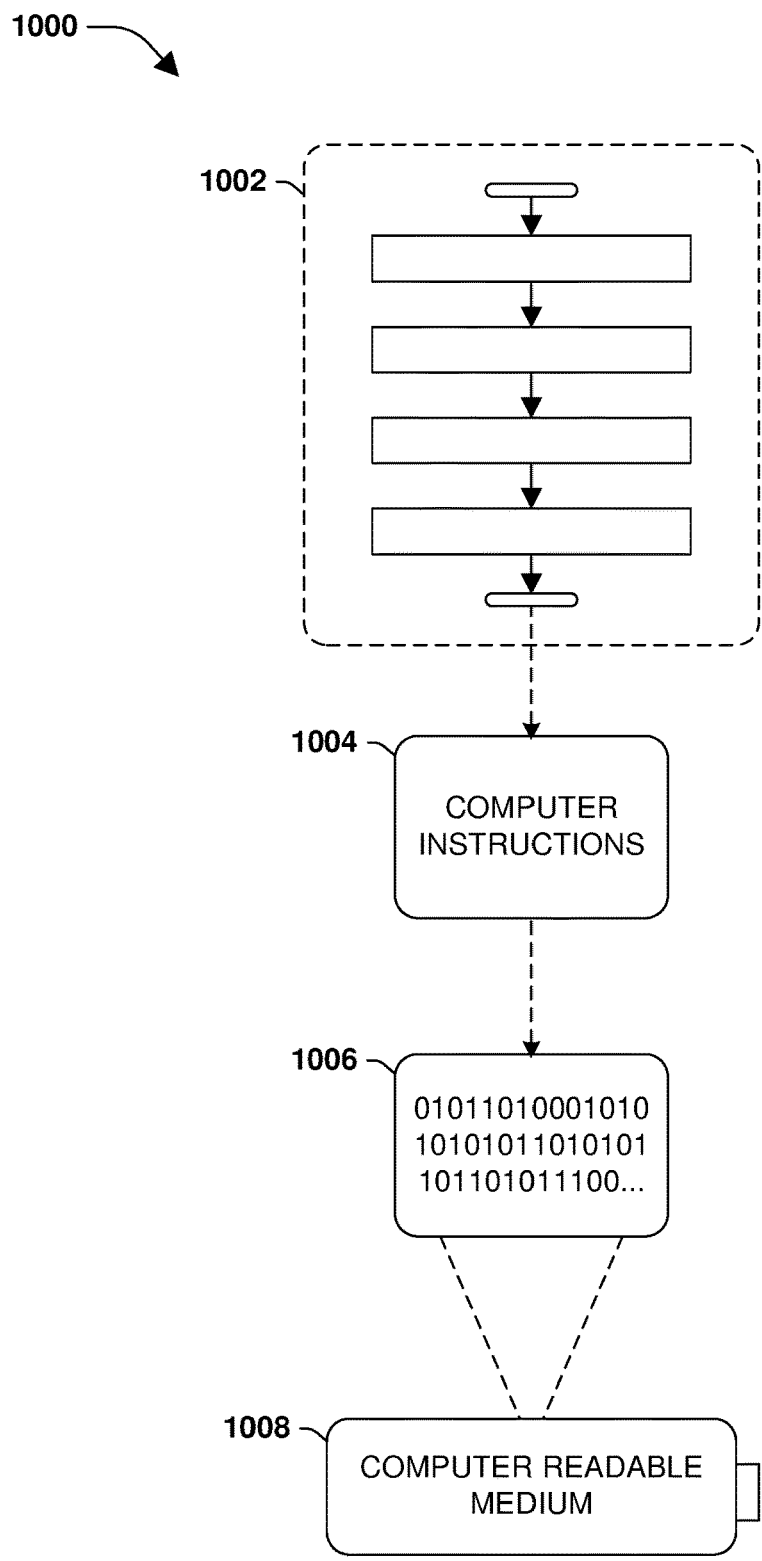
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a compact disc-recordable (CD-R), a digital versatile disc-recordable (DVD-R), flash drive, a platter of a hard disk drive, etc., on which is encoded computer-readable data 1006. This computer-readable data 1006, such as binary data comprising at least one of a zero or a one, in turn comprises a processor-executable computer instructions 1004 configured to operate according to one or more of the principles set forth herein. In some embodiments, the processor-executable computer instructions 1004 are configured to perform a method 1002, such as at least some of the exemplary method 300 of FIG. 3, for example. In some embodiments, the processor-executable computer instructions 1004 are configured to implement a system, such as at least some of the exemplary system 400 of FIG. 4, exemplary system 500 of FIG. 5, exemplary system 600 of FIGS. 6A-6B, exemplary system 700 of FIG. 7, exemplary system 800 of FIG. 8, and/or at least some of the exemplary system 900 of FIG. 9, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   creating an object within a remote object store;
   populating the object with a first object page comprising a first data chunk of first data, from a storage tier, accessible through a first volume;
   populating the first object page with a first context entry specifying a location for the first data chunk within the first volume;
   populating a header for the object with an identifier of the object and a universal identifier of the first volume; and
   providing the first data chunk from the object within the remote object store in response to a request received for the first data.

2. The method of claim 1, wherein the populating comprises:
   performing a two-step put and verify operation by performing a put operation to store the object to the remote object store and a verification get operation to read the header of the object to verify the identifier as a name of the object based upon completion of the put operation.

3. The method of claim 1, wherein the populating comprises:
   performing a two-step put and verify operation by performing a put operation to store the object to the remote object store and a verification get operation to read the header of the object to verify the universal identifier is for first volume.

4. The method of claim 2, wherein the performing a verification get operation comprises:
   issuing the verification get operation with a same priority as the put operation.

5. The method of claim 2, wherein the performing a verification get operation comprises:
   issuing the verification get operation with a different priority than client put and get operations, wherein the verification get operation is issued to the remote object store in a path that is decoupled from a client access path to the remote object store.

6. The method of claim 1, comprising:
   verifying every nth object within the remote object store by performing a two-step put and verify operation comprising performing a put operation to store the object to the remote object store and performing a verification get operation to read the header of the object to verify the identifier and the universal identifier.

7. The method of claim 1, wherein the object comprises a first object page and a second object page, the method comprising:
   accessing the first object page, without access the second object page, within the object using an offset associated with first object page.

8. The method of claim 1, comprising:
   populating the first context entry with a checksum for the first data chunk and the first context entry, wherein the checksum is used to verify the first data chunk within the object.

9. A non-transitory machine readable medium comprising instructions for performing a method, which when executed by a machine, causes the machine to:
   maintain an object within a remote object store, the object comprising:
   a first object page comprising:

a first data chunk of first data, from a storage tier, accessible through a first volume; and a first context entry specifying a location for the first data chunk within the first volume; and a header with an identifier of the object and a universal identifier of the first volume;

populate a metafile with a mapping between the universal identifier and the object;

provide access to the first data chunk within the object in response to a request received for the first data based upon a target universal identifier, specified by the request for the first data, matching the universal identifier within the metafile.

10. The non-transitory machine readable medium of claim 9, wherein the instructions cause the machine to:

determine that the metafile is corrupt based upon the target universal identifier not matching the universal identifier within the metafile.

11. The non-transitory machine readable medium of claim 9, wherein the instructions cause the machine to:

generate a name for the object based upon the universal identifier within the metafile.

12. The non-transitory machine readable medium of claim 9, wherein the instructions cause the machine to:

assign monotonically increasing sequence numbers to objects within the remote object store, wherein the object is assigned a first sequence number.

13. The non-transitory machine readable medium of claim 9, wherein the instructions cause the machine to:

perform a volume move operation for the first volume to move the first volume from a first location to a second location resulting in a moved first volume, wherein the metafile is updated with an updated universal identifier for the moved first volume.

14. The non-transitory machine readable medium of claim 9, wherein the instructions cause the machine to:

perform a two-step put and verify operation by performing a put operation to store the object to the remote object store and a verification get operation to read the header of the object to verify the identifier and the universal identifier.

15. A computing device comprising:

a memory comprising machine executable code; and a processor coupled to the memory, the processor configured to execute the machine executable code to cause the processor to:

perform a two-step put and verify operation, comprising:

creating an object within a remote object store;

populating the object with a first object page comprising a first data chunk of first data, from a storage tier, accessible through a first volume;

populating the first object page with a first context entry specifying a location for the first data chunk within the first volume;

populating a header for the object with an identifier of the object and a universal identifier of the first volume; and performing a verification get operation to read the header of the object to verify the identifier and the universal identifier.

16. The computing device of claim 15, wherein the machine executable code causes the processor to:

specify a client operation timeout timer, for timing out client operations, to have a first timeout value and an object store access timeout timer, for timing out operations to the remote object store, to have a second timeout value smaller than the first timeout value.

17. The computing device of claim 16, wherein the machine executable code causes the processor to:

specify a second remote object store access timeout timer, for timing out operations to a second remote object store, to have a third timeout value different than the second timeout value.

18. The computing device of claim 15, wherein the machine executable code causes the processor to:

dynamically adjust an amount of I/O throughput to the remote object store based upon a latency of the remote object store.

19. The computing device of claim 15, wherein the machine executable code causes the processor to:

dynamically adjust a first amount of I/O throughput to the remote object store based upon a first latency of the remote object store and a second amount of I/O throughput to a second remote object store based upon a second latency of the second remote object store.

20. The computing device of claim 15, wherein the machine executable code causes the processor to:

assign monotonically increasing sequence numbers to objects within the remote object store, wherein the object is assigned a first sequence number.

* * * * *